(12) United States Patent
Chapman et al.

(10) Patent No.: US 9,990,504 B1
(45) Date of Patent: Jun. 5, 2018

(54) SYSTEMS AND METHODS FOR GENERATING AND MAINTAINING IMMUTABLE DIGITAL MEETING RECORDS WITHIN DISTRIBUTED NETWORK NODES

(71) Applicant: NORTHERN TRUST CORPORATION, Chicago, IL (US)

(72) Inventors: Justin Chapman, London (GB);
Andrew Czupek, Chicago, IL (US);
Andrew Monks, Chicago, IL (US);
Anthony Stevens, Herefordshire (GB);
Arijit Das, Naperville, IL (US); Wayne Hannaway, Westclif-On-Sea (GB);
Zabrina Smith, London (GB)

(73) Assignee: Northern Trust Corporation, Chicago, IL (US)

( * ) Notice: Subject to any disclaimer, the term of this patent is extended or adjusted under 35 U.S.C. 154(b) by 0 days. days.

(21) Appl. No.: 15/846,059

(22) Filed: Dec. 18, 2017

(51) Int. Cl.
*G06F 21/60* (2013.01)
*H04L 9/06* (2006.01)
(Continued)

(52) U.S. Cl.
CPC ......... *G06F 21/602* (2013.01); *G06Q 10/109* (2013.01); *H04L 9/0637* (2013.01);
(Continued)

(58) Field of Classification Search
CPC ... G06F 21/602; G06Q 10/109; H04L 9/0637; H04L 9/0643; H04L 12/1831; H04L 63/0428; H04L 63/0861; H04W 4/023
See application file for complete search history.

(56) References Cited

U.S. PATENT DOCUMENTS 6,792,536 B1 9/2004 Teppler
8,023,648 B2 9/2011 Seppanen
(Continued)

FOREIGN PATENT DOCUMENTS

WO 2016128567 A1 8/2016
WO 2016170538 A1 10/2016
(Continued)

OTHER PUBLICATIONS

Pamela Morgan, "Using Blockchain Technology to Prove Existence of a Document", Brave New Coin, http://bravenewcoin.com/news/using-blockchain-technology-to-prove-existence-of-a-document/, Dec. 5, 2014, 9 pages.

(Continued)

*Primary Examiner* — Harunur Rashid
(74) *Attorney, Agent, or Firm* — Eric L. Sophir; Dentons US LLP (57) ABSTRACT

Embodiments disclosed herein provide systems and methods for digital meeting management within a blockchain. Before a meeting, a computer may generate a digital meeting record containing a plurality of data fields and linked to various smart contracts to capture meeting activities. During the meeting, a first smart contract may authenticate and record attendees in the digital meeting record based on biometric information received from the attendees' devices. Furthermore, a second smart contract may capture in the digital meeting record, meeting actions of each attendee, including date, time, and location associated with the meeting actions. After the meeting, a third smart contract may autopopulate post meeting documentation. After review by the attendees, the third smart contract may store a hash of the documentation to the digital meeting record and store the documentation in a repository. Once appended to the block- (Continued)

chain, the digital meeting record becomes an immutable record of the meeting.

16 Claims, 4 Drawing Sheets

(51) Int. Cl.
*H04L 29/06* (2006.01)
*H04L 12/18* (2006.01)
*G06Q 10/10* (2012.01)
*H04W 4/02* (2018.01)

(52) U.S. Cl.
CPC ........ *H04L 9/0643* (2013.01); *H04L 12/1831* (2013.01); *H04L 63/0428* (2013.01); *H04L 63/0861* (2013.01); *H04W 4/023* (2013.01)

(56) References Cited

U.S. PATENT DOCUMENTS

| | | |
|---|---|---|
| 3,049,010 A1 | 6/2015 | Jueneman et al. |
| 2006/0095376 A1 | 5/2006 | Mitchell et al. |
| 2008/0209516 A1* | 8/2008 | Nassiri .................... G06F 21/32 726/3 |
| 2010/0185847 A1* | 7/2010 | Shasha ................ G06F 11/1004 713/150 |
| 2012/0293599 A1* | 11/2012 | Norlin ................ G06K 9/00221 348/14.01 |
| 2015/0095999 A1 | 4/2015 | Toth |
| 2015/0096000 A1 | 4/2015 | Sharif et al. |
| 2015/0128240 A1 | 5/2015 | Richards et al. |
| 2015/0379510 A1 | 12/2015 | Smith |
| 2016/0027229 A1 | 1/2016 | Spanos et al. |
| 2016/0162897 A1 | 6/2016 | Feeney |
| 2016/0269402 A1 | 9/2016 | Carter et al. |
| 2016/0275461 A1 | 9/2016 | Sprague et al. |
| 2016/0283920 A1 | 9/2016 | Fisher et al. |
| 2016/0306982 A1 | 10/2016 | Seger, II et al. |
| 2016/0323109 A1 | 11/2016 | McCoy et al. |
| 2016/0328713 A1 | 11/2016 | Ebrahimi |
| 2016/0358158 A1 | 12/2016 | Radocchia et al. |
| 2017/0046689 A1 | 2/2017 | Lohe et al. |
| 2017/0048217 A1 | 2/2017 | Biggs et al. |
| 2017/0091397 A1 | 3/2017 | Shah |
| 2017/0103472 A1 | 4/2017 | Shah |
| 2017/0134375 A1 | 5/2017 | Wagner |
| 2017/0161439 A1* | 6/2017 | Raduchel ............. G06Q 10/063 |
| 2017/0180128 A1 | 6/2017 | Lu |
| 2017/0232300 A1 | 8/2017 | Tran et al. |
| 2017/0236094 A1 | 8/2017 | Shah |
| 2017/0279774 A1 | 9/2017 | Booz et al. |
| 2017/0318141 A1 | 11/2017 | Gerace et al. |
| 2017/0330174 A1* | 11/2017 | Demarinis ......... G06Q 20/3829 |

FOREIGN PATENT DOCUMENTS

| | | |
|---|---|---|
| WO | 2017044554 A1 | 3/2017 |
| WO | 2017066002 A1 | 4/2017 |

OTHER PUBLICATIONS

BitScan, How to Establish Proof-of-Existence on the Bitcoin Blockchain, http://bitscan.com/artides/how-to-establish-proof-of-existence-on-the-bitcoin-blockchain, Nov. 10, 2015, 4 pages.

Jacobovitz, "Blockchain for Identity Management", https://www.cs.bgu.acil/-Frankel/TechnicalReports/2016/16-02.pdf, Dec. 2016, 19 pages.

Hammudoglu et al., "Portable Trust: biometric-based authentication and blockchain storage for self-sovereign identity systems", https://arxiv.org/pdf/1706.03744.pdf, Nov. 14, 2017, 6 pages.

Lewison et al., "Rich Credentials for Remote Identity Proofing", Revised Jul. 10, 2017; first version, https://pomcor.com/techreports/RichCredentials.pdf, Oct. 15, 2016, pp. 1-64.

Milanovic, "The next revolution will be reclaiming your digital identity", https://techcrunch.com/2017/10/17/the-next-revolution-will-be-reclaiming-your-digital-identity/, Oct. 17, 2017, 16 pages.

Xia et al., "BBDS: Blockchain-Based Data Sharing for Electronic Medical Records in Cloud Environments", http://www.mdpi.com/2078-2489/8/2/44/htm, published Apr. 17, 2017, 28 pages.

Notification of Transmittal of the International Search Report and the Written Opinion of the International Searching Authority, dated Mar. 8, 2018, 8 pages.

Swan M., Blockchain: Blueprint for a new economy. [online] "O'Reilly Media, Inc.", published Jan 24, 2015. Retrieved on Feb. 26, 2018 (Feb. 26, 2018) retrieved from the Internet<URL:http://w2.bloachain-tech.net/blockchain/blockchain-by-melanie-swan.pdf> (p. 16, 17, 24-25, 62).

Van der Elst et al., "Bringing the AGM to the 21st Century: Blockchain and Smart Contracting Tech for Shareholder Involvement," retrieved from the Internet: http://www.ecgi.global/sites/default/working_papers/documents/3582017.pdf, published Jun. 2017, 31 pages.

World Economic Forum / Deloitte, "The future of financial infrastructure—An ambitious look at how blockchain can reshape financial services," retrieved from the Internet: http://www3.weforum.org/docs/WEF_The_future_of_financial_infrasructure.pdf, published Aug. 2016, 130 pages.

Wright et al., Decentralized Blockchain Technology and the Rise of Lex Cryptographia, Retrieved from the Internet: http://www.the-blockchain.com/docs/Decentralized%20Blockchain%20Technology%20And%20The%20Rise%20Of%20Lex%20Cryptographia.pdf, Mar. 12, 2015, 58 pages.

Global Delaware Blog, "Delaware judge outlines how blockchain technology can solve stockholder voting issues", retrieved from the Internet: https://global.delaware.gov/2016/11/01/delaware-judge-outlines-how-blockchain-technology-can-solve-stockholder-voting-issues/, Nov. 1, 2016, 4 pages.

International Search Report and Written Opinion of the International Searching Authority, dated Mar. 8, 2018, in corresponding International Application No. PCT/US17/067177, 10 pages.

\* cited by examiner

SYSTEMS AND METHODS FOR GENERATING AND MAINTAINING IMMUTABLE DIGITAL MEETING RECORDS WITHIN DISTRIBUTED NETWORK NODES

CROSS REFERENCE TO RELATED APPLICATIONS

This application is related to U.S. patent application Ser. No. 15/845,662, filed on Dec. 18, 2017, which is hereby incorporated by reference in its entirety.

TECHNICAL FIELD

This application relates generally to distributed database within distributed network nodes and more specifically to generating and maintaining immutable digital meeting records within the distributed network nodes.

BACKGROUND

Distributed databases such as distributed ledgers ensure the integrity of data by generating a chain of data blocks linked together by cryptographic hashes of the data records in the data blocks. For example, a cryptographic hash of at least a portion of data records within a first block, and, in some cases, combined with a portion of data records in previous blocks is used to generate the block address for a new block succeeding the first block. As an update to the data records stored in the one or more data blocks, a new data block is generated containing respective updated data records and linked to a preceding block with an address based upon a cryptographic hash of at least a portion of the data records in the preceding block. In other words, the linked blocks form a blockchain that inherently includes a traceable sequence of addresses that can be used to track the updates to the data records contained therein. The linked blocks (or blockchain) may be distributed among multiple network nodes within a computer network such that each node may maintain a copy of the blockchain. Malicious network nodes attempting to compromise the integrity of the database have to recreate and redistribute the blockchain faster than the honest network nodes, which, in most cases, is computationally infeasible. In other words, data integrity is guaranteed by the virtue of multiple network nodes in a network having a copy of the same blockchain. A central trust authority is therefore not required to vouch for the integrity of the distributed database hosted by multiple nodes in the network.

However, within a distributed network nodes environment such as a one hosting a blockchain, conventional computing systems have several technical shortcomings. In other words, several technical problems are not addressed by conventional blockchain technology. One problem is how to provide a functionality of an intelligent digital meeting management that integrates interactions between digital identities within the blockchain, authentication and recording processes using biometric information, document storage in a repository, and one or more smart contracts managing meeting activities in real-time. The conventional computing systems and conventional databases do not provide a solution to this problem but merely serve as a passive data repository.

SUMMARY

What is therefore desired is a system and a method for intelligent digital meeting management within a distributed network nodes environment. More particularly, what is desired is a system and a method that intelligently generates an immutable digital meeting record based upon executing one or more smart contracts within a blockchain capturing all meeting activities and decisions, and automatically generates post meeting documentation.

Embodiments disclosed herein solve the aforementioned technical problems and may provide other benefits as well. Embodiments disclosed herein provide computing systems and computer-based methods for generating and maintaining one or more immutable digital meeting records. For example, a computing system may generate a digital meeting record before a scheduled meeting, associating the digital meeting record with respective digital identity records of multiple attendees and documents associated with the meeting. The computing system may import into or otherwise link the digital meeting record with one or more smart contracts containing coded conditions for intelligent meeting management. For instance, a first smart contract may authenticate each attendee based on received biometric information, a second smart contract may record meeting actions of each attendee, a third smart contract may generate and record a status of a meeting decision, and a fourth smart contract may autopopulate a post meeting document. Using such smart contracts, the computing system may store into the digital meeting record, actions of each attendee in association with a hash of respective biometric information, cryptographic hash of the documents including post meeting documents for the meeting. The computing system may append the digital meeting record in the blockchain, thereby creating an immutable record of all the activities and documents associated with the meeting.

In an embodiment, computer-implemented method for generating an immutable digital meeting record comprises: generating, by a network node of a plurality of network nodes, a digital meeting record containing one or more data fields for information associated with a meeting; importing, by the network node to the digital meeting record, a meeting decision executable code located in a block of a block chain, the meeting decision executable code containing one or more coded conditions for a decision in the meeting from a decision criteria library stored in a blockchain; associating, by the network node, the digital meeting record with a plurality of digital identity records stored in the blockchain, wherein each of the plurality of digital identity records is associated with a respective attendee of the meeting; executing, by the network node, an attendee verification executable code to authenticate a plurality of attendees to the meeting, wherein authentication for each attendee is based upon a match between a one directional cryptographic hash of biometric information received from the attendee and a one directional cryptographic hash stored in a respective digital identity record associated with the attendee, wherein the respective digital identity record stores the one directional cryptographic hash of biometric information without storing the biometric information; generating, by the network node, a one directional cryptographic hash of a document and storing in the digital meeting record the one directional cryptographic hash in association with the a first digital identity record of a first attendee of the plurality of attendees, wherein the document is stored in a non-blockchain document repository; executing, by the network node, an attendee action executable code to capture in real-time and store in the digital meeting record actions of each of the plurality of attendees; executing, by the network node, the meeting decision executable code on the captured actions of each of the plurality of attendees to determine one or more meeting decisions; storing, by the network node in the digital meeting record, the one or more meeting decisions; encrypting, by the network node, at least a portion of the digital meeting record using one or more encryption keys to generate an encrypted digital meeting record; and appending, by the network node, the encrypted digital meeting record to the blockchain.

In an embodiment, a system for generating an immutable digital meeting record comprises: a plurality of network nodes, each including a non-transitory storage medium storing a respective local copy of a blockchain; at least one of the plurality of network nodes having a processor configured to: generate a digital meeting record containing one or more data fields for information associated with a meeting; import to the digital meeting record, a meeting decision executable code located in a block of a block chain, the meeting decision executable code containing one or more coded conditions for a decision in the meeting from a decision criteria library stored in a blockchain; associate the digital meeting record with a plurality of digital identity records stored in the blockchain, wherein each of the plurality of digital identity records is associated with a respective attendee of the meeting; execute an attendee verification executable code to authenticate a plurality of attendees to the meeting, wherein authentication for each attendee is based upon a match between a one directional cryptographic hash of biometric information received from the attendee and a one directional cryptographic hash stored in a respective digital identity record associated with the attendee, wherein the respective digital identity record stores the one directional cryptographic hash of biometric information without storing the biometric information; generate a one directional cryptographic hash of a document and store in the digital meeting record the one directional cryptographic hash in association with the a first digital identity record of a first attendee of the plurality of attendees, wherein the document is stored in a non-blockchain document repository; execute an attendee action executable code to capture in real-time and store in the digital meeting record actions of each of the plurality of attendees; execute the meeting decision executable code on the captured actions of each of the plurality of attendees to determine one or more meeting decisions; store in the digital meeting record, the one or more meeting decisions; encrypt at least a portion of the digital meeting record using one or more encryption keys to generate an encrypted digital meeting record; and append the encrypted digital meeting record to the blockchain.

It is to be understood that both the foregoing general description and the following detailed description are exemplary and explanatory and are intended to provide further explanation of the invention as claimed.

BRIEF DESCRIPTION OF THE DRAWINGS

The accompanying drawings constitute a part of this specification and illustrate an embodiment of the invention and together with the specification, explain the invention.

DETAILED DESCRIPTION

Reference will now be made to the exemplary embodiments illustrated in the drawings, and specific language will be used here to describe the same. It will nevertheless be understood that no limitation of the scope of the invention is thereby intended. Alterations and further modifications of the inventive features illustrated here, and additional applications of the principles of the inventions as illustrated here, which would occur to a person skilled in the relevant art and having possession of this disclosure, are to be considered within the scope of the invention.

Embodiments disclosed herein describe systems, methods, and products for generating and maintaining digital meeting records within a distributed nodes environment. In other words, this disclosure describes technical systems, methods, and products that enable key attributes of physical meetings to be electronically managed and recorded on the blockchain to provide an immutable and digital meeting record that is made available to parties via a permissioned and controlled smart contract framework. The digital meeting record is created on the blockchain and will capture and record key meeting attributes providing auditability of the meeting lifecycle. Embodiments disclosed herein therefore implement an integration of functionalities not provided by the conventional computing systems.

Prior to a meeting, a network node may generate a digital meeting record to establish a framework for capturing meeting activities, documentations, and decisions; and executing smart contracts associated with various activities of the meeting. To establish such framework, the network node may, in some implementations, link the digital meeting record with digital identity records of the expected meeting attendees. In other implementations, the network node may import the digital identity records into one or more data fields of the digital meeting record. The network node may also record information of meeting documents (e.g. agenda, proposal, and report) into the generated digital meeting record. To do so, the network node may generate a one directional cryptographic hash of the meeting documents and store the generated hash in a data field of the digital meeting record; and store the meeting documents themselves in a non-blockchain based document repository.

In some embodiments, the network node may link one or more smart contracts with the generated digital meeting record. In these embodiments, the network node may retrieve, from a database accessible to the network node, block addresses for the one or more smart contracts and store the block addresses in one or more data fields of the digital meeting record, such that that the network node may download the respective smart contracts and execute the same to achieve desired functionality. In other embodiments, the network node may import the one or more smart contracts within the digital meeting record. In these embodiments, the network node may download the one or more smart contracts from the blockchain based upon the respective block addresses stored in the database accessible to the network node, and store the executable code of the one or more smart contracts within the digital meeting record itself.

The one or more smart contracts may be executable code stored in one or more blocks in the blockchain. The one or more smart contracts may include an attendee verification smart contract that contains an executable code to authenticate and record an attendee to the meeting. The attendee verification smart contract may receive a user identifier and biometric information of a user, such as fingerprint scan data or retina scan data. The attendee verification smart contract may then generate a one directional cryptographic hash of the received biometric information after which the attendee verification smart contract may use the user identifier to retrieve the digital identity record of the attendee from the blockchain or within the digital meeting record. The attendee verification smart contract may then compare the generated cryptographic hash to a biometric information hash stored in the digital identity record. If the comparison returns a match, the attendee verification smart contract may indicate in the digital meeting record that a user associated with the user identifier has been authenticated as an attendee and the presence of the attendee has been recorded. If however, the comparison returns a mismatch, the attendee verification smart contract may prompt the user to reenter or resend the biometric information. After a set number of attempts, the attendee verification smart contact may block the user from further authentication attempts. In addition to the biometric authentication, the attendee verification smart contract, in some embodiments, checks the permission controls in the user's identity record to check whether the user has requisite permissions to attend the meeting. If the attendee verification smart contract determines that the user is not permissioned to attend the meeting, the attendee verification smart contract may not allow an authentication attempt from the user.

The one or more smart contracts may include an attendee action smart contract which may capture various actions of an attendee. The various actions of an attendee may include voting, decisions, and/or any other types of actions of the attendees. In addition to the various actions, the attendee action smart contract may capture various attributes associated with those actions. These various attributes may include, for example, the location of the attendee when the attendee took an action/decision and the date and time of the action/decision.

The one or more smart contracts may also include a meeting decision smart contract, which may be an executable code containing one or more coded conditions for reaching a decision in the meeting. The meeting decision smart contract may take in for input, actions such as voting by attendees in the meeting; and generate a decisions based on the actions. For example, the meeting may include a proposal that can be passed by a simple majority; and the meeting decision smart contract may determine based on the metadata within the proposal or other data associated with the proposal that a simple majority will suffice. The meeting decision smart contract may then determine the total number of voting attendees in the meeting and calculate the number of affirming votes for the passage of the proposal. Once the voting process begins, the meeting decision smart contract may tally the votes to ascertain whether the requisite number of votes for a simple majority has been reached. If the meeting decision smart contract determines that the requisite number of votes have been reached, the meeting decision smart contract may update the digital meeting record to indicate that the proposal has been passed.

The network node may also perform post meeting management in association with the digital meeting record. For example, the network node may generate one or more post-meeting documentation. An exemplary post-meeting documentation may be meeting minutes recording various actions and decisions undertaken during the meeting. In some embodiments, the network node may autopopulate a post meeting documentation with information in the digital meeting record. The network node may store the post meeting documentation in a non-blockchain repository. Furthermore, the network node may generate a one directional cryptographic hash of the post-meeting documentation and store the generated cryptographic hash in the digital meeting record. Furthermore, the network node may store the cryptographic hash of the post meeting documentation in association with hashes of biometric information of the attendees who have approved the post meeting documentation. The hashes of the biometric information may serve as the attendees' approval signature.

The network node may then upload the digital meeting record as a block in the latest valid blockchain, thereby creating an immutable record of the meeting in the blockchain. The network node may determine the latest valid blockchain based upon polling of other networks and using a consensus threshold. In some embodiments, the network node may associated the digital meeting record with permission controls such as a permissions table such that users with appropriate permissions in their digital identity record may access the digital meeting record.

One having ordinary skill in the art understands that the aforementioned one or more smart contracts and the specific coded conditions within the smart contracts are merely exemplary and other types of smart contracts with other types of coded conditions should be considered within the scope of this disclosure. Furthermore, although the aforementioned embodiments describe a network node implementing the various functionalities, one having ordinary skill in the art should understand a single network node was included only for brevity, and should not be limiting. Multiple network nodes within the distributed network nodes and other associating computing systems implementing these functionalities should be considered to be within the scope of this disclosure.

Figure 1:
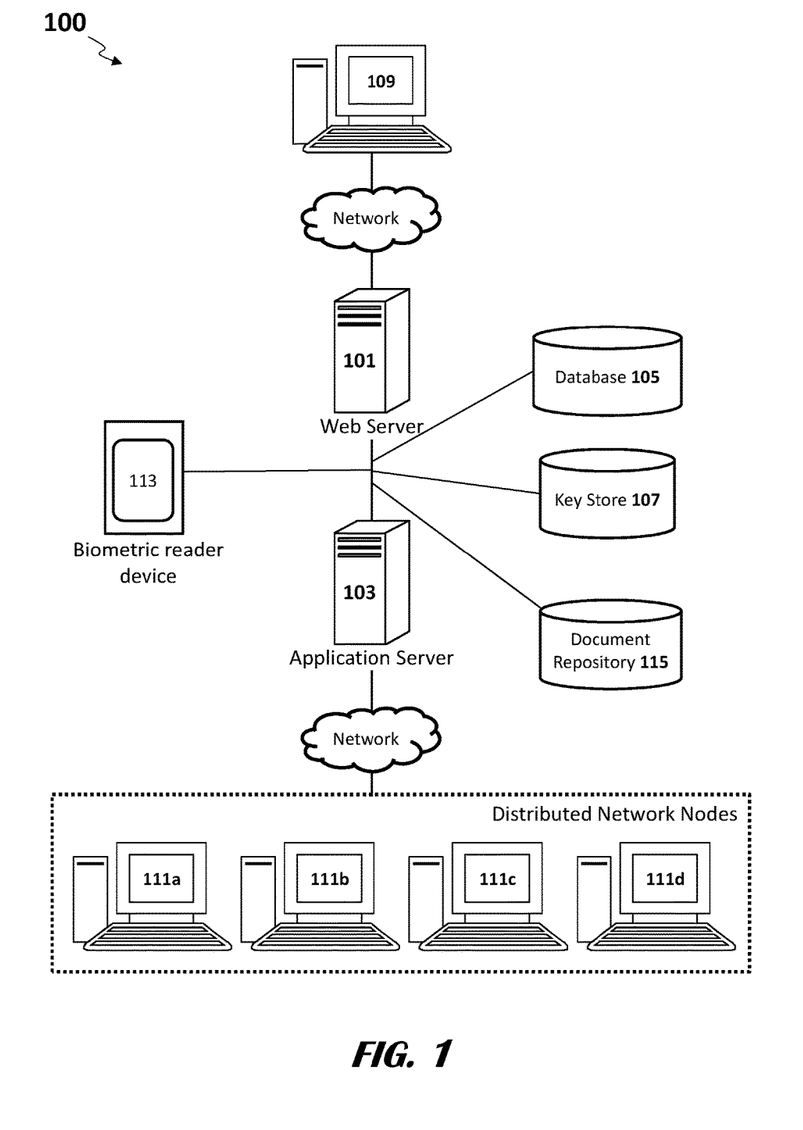
FIG. 1 shows components of an exemplary system 100 for digital meetings management, according to an exemplary embodiment.

FIG. 1 shows components of a system 100 for digital meeting management, according to an exemplary embodiment. The exemplary system 100 may comprise a webserver 101, an application server 103, databases 105, a key store 107, a client device 109, distributed network nodes 111, a biometric reader device 113, and a document repository 115. Aspects of the system 100 may be configured to employ and manage a system blockchain, sometimes referred to in the art as a "distributed ledger," and may include blockchain-based distributed ledger software (e.g., Hyperledger, Ethereum, Openchain, TerraLedger). In some implementations, the system blockchain may be a private party blockchain. The system blockchain may operate as a distributed database that stores data records associated with entities and transaction documents, where the data records stored on the system blockchain may be blocks of data that are hosted on distributed network nodes 111. The data records associated with the entities may include digital meeting records. In some instances, the system 100 may store the permission controls associated with the digital meeting records. The permission controls may in some instances comprise a permission table indicating the access rights of the users, based on the respective digital identity records, to the digital meeting records. It should be appreciated that the data stored in records within system databases 105 may vary from the data stored in blocks of the system blockchain hosted on network nodes 111.

A webserver 101 may host a website accessible to end-users, where the content presented via the various webpages may be controlled based upon each particular user's role and/or permissions as indicated in the permission controls in a digital identity record associated with the user. For example, a user may be an admin user, as indicated in the permission controls in the digital identity record of the user, with more permissions compared to a normal user. As indicated before, the system 100 may store the permission controls for the admin user or any other user in their respective digital identity record. The webserver 101 may be any computing device comprising a processor and non-transitory machine-readable storage capable of executing the various tasks and processes described herein. Non-limiting examples of such computing devices may include workstation computers, server computers, laptop computers, and the like. While the exemplary system 100 includes a single webserver 101, one having skill in the art would appreciate that some embodiments the webserver 101 may include any number of computing devices operating in a distributed computing environment.

The webserver 101 may execute software applications configured to host a website (e.g., Apache®, Microsoft IIS®), which may generate and serve various webpages to client devices 109. The website may be used to generate and access data stored on a system database 105 or in a blockchain hosted by distributed nodes 111 of the system 100. In some implementations, the webserver 101 may be configured to require user authentication based upon a set of user authorization credentials (e.g., username, password, biometrics, cryptographic certificate). In such implementations, the webserver 101 may access a system database 105 configured to store user credentials, which the webserver 101 may be configured to reference in order to determine whether a set of entered credentials (purportedly authenticating the user) match an appropriate set of credentials that identify and authenticate the user. Similarly, in some implementations, the webserver 101 may generate and serve webpages to a client device 109 based upon a user role within the system 100 (e.g., administrator, investor, investment promoter). In such implementations, the user role may be defined by data fields in user records stored in the system database 105, and authentication of the user and user role may be conducted by the webserver 101 by executing an access directory protocol (e.g. LDAP). The webserver 101 may then be instructed to generate webpage content, access or generate data stored in the system database 105, and access or generate data stored in the blockchain instances, according to the user role defined by the user record in the system database 105.

In some implementations, the system blockchain may include permission controls defining a user's role within the system 100. The system blockchain may include a block with a smart contract containing permission controls that define the user's role within the system. For example, the smart contract, through the permission controls, may define the user to be a system administrator (that is, an admin user). As another example, the permission controls may define the level of authorization for non admin user to access information stored in the blockchain or initiating a blockchain based functionality. In a private equity context, the blockchain based functionality may include initiating capital calls, uploading documents to the system 100, and/or other functionalities. The system 100 may store the permission controls within a respective user's digital identity record or in association with the respective user's digital identity record. Although the descriptions above and below describe a user and user's digital identity record and permission controls, one having ordinary skill in the art should understand that this description is applicable to non-human entities such as bank servers or other corporation servers having a digital identity record and permission controls within the system 100. In other words, the system 100 may maintain the digital identity and permission controls regardless of whether or not the associated entities are human users or non-human computing systems.

An application server 103 may generate, access, and update blockchain instances hosted on the network nodes 111, according to instructions received from a client device 109 via a webserver 101. The application server 103 may be any computing device comprising a processor and non-transitory machine-readable storage capable of executing the various tasks and processes described herein. Non-limiting examples of such computing devices may include workstation computers, laptop computers, server computers, and the like. While the exemplary system 100 includes a single application server 103, one having skill in the art would appreciate that in some embodiments the application server 103 may include any number of computing devices operating in a distributed computing environment. It would also be appreciated that although the application server 103 is shown in FIG. 1 as being a separate device from a webserver 101, in some embodiments the webserver 101 and the application server 103 may be the same device. Furthermore, one having ordinary skill in the art understands that one or more of the client device 109, the webserver 101, databases 105, key store 107, and the application server 103 may be a part of a network node of the distributed network nodes 111.

Software executed by the application server 103 may provide blockchain services to users interacting with the application server 103 via the webserver 101. The application server 103 may update and query the record in the system database 105 according to the instructions received from the client device 109. The application server 103 may then generate blocks for the system blockchain, where the blocks contain data from the records of the system database 105 and/or data records received from the users. The application server may then update a local instance of the system blockchain, and subsequently instruct network nodes 111 to update the instances of the system blockchain stored locally on each of the network nodes 111. Each new block may be generated with a timestamp or other data that links the new block with existing blocks on the blockchain. As an example, when the application server 103 generates a new digital identity record in the system database 105, the application server 103 may generate a new block containing the digital identity record and an address of the new block based upon a one directional cryptographic hash of the information stored in the digital identity record. The application server 103 may then append the new block for the system blockchain within the local instance of the blockchain stored in the application server 103. The application server 103 may then transmit the new block to each respective network node 111. The network nodes 111, in turn, update the local instances of the blockchain stored on each of the network nodes 111. In other implementations, the application server 103 may transmit the blockchain or portions thereof to the network node 111, and the network nodes may accordingly replace the local copies of the system blockchain or portions thereof using the transmission received from the application server 103.

In operation, when a user or a smart contract being executed instructs the application server 103 to conduct a transaction requiring a query of the blocks of the blockchain, the application server 103 may conduct a poll of the network nodes 111 to identify the queried data, based on the hash values identifying the blocks, and then determine whether the data within the identified blocks is accurate. The application server 103 may then await a response from a predetermined quorum of network nodes 111 to confirm the data in the blocks; the application server 103 may then proceed with a processing transaction using the data blocks of the blockchain, provided that a predetermined threshold number of network nodes 111 indicate that the blocks at issue match the blocks of the instance stored locally on each of the network nodes 111. In some implementations, the application server 103 may transmit a request to the network nodes 111 to respond with the latest blockchain stored by each network node 111. Once the application server 103 receives the blockchains from the respective nodes 111, the application server 103 may compare the received blockchains with the local copy of the blockchain. If a threshold number of blockchains match each other, the application server 103 may determine that the integrity of the blockchain has not been compromised. The threshold may be set by an admin user with appropriate authority based on the criticality of the data stored in the blockchain. For example, a blockchain with more critical data may be associated with a higher threshold than a blockchain with less critical data.

The application server 103 may generate block addresses for data to be retrieved from blockchain instances of the system blockchain. Machine-readable computer files containing various forms of documents (e.g., PDF, DOC, XLS) may be uploaded to the application server 103 via a webserver 101, or otherwise stored into a system database 105, after which the application server 103 may generate a hash value of the document, where the application uses the hash value or other identifier value to reference the file from a system database 105. The application server 103 may then generate the block address for the file by generating a hash of the document and a hash value of the immediately preceding block data or block address of the system blockchain. This block address may then be stored into the system database 105 in a document record along with the file and any number of additional data field entries related to the computer file. In operation, the application server 103 or network nodes 111 may reference the block of the blockchain containing the file according to the block address. The application server 103 may generate additional blocks and corresponding block addresses on the system blockchain in a similar manner—e.g., generating a hash value for a block containing user data and then generating a new block address using the block address of the preceding block. One having skill in the art will appreciate that block addresses may be generated in any number of combinations of hashed block data and/or hashed block addresses from the new block and one or more preceding blocks, such that the address of the new block is dependent upon, or otherwise linked to, at least the immediately preceding block.

In some implementations, a system blockchain may contain smart contracts, which may be executable coded scripts that instruct the application server 103 and/or network nodes 111 to perform predetermined processes when certain conditions, as indicated by the smart contract, are satisfied. In some instances, these processes instruct the application server 103 and/or network nodes 111 to generate a new block on the blockchain, often superseding and/or updating the information found in existing blocks in the system blockchain. In some implementations, a smart contract may be employed by the system 100 to control user access to machine-readable computer files stored on the system blockchain and/or in a system database 105. The smart contract may comprise code functioning logically as a matrix table for user permissions that associates users or user roles with documents contained within the computer files stored in the system database 105. In such implementations, the smart contract may comprise machine-readable software code that includes instructions for the application server 103 and network nodes 111, and, in some cases, block addresses for blocks on the system blockchain for blocks containing digital identity record in a system database 105, user role rules in the system database 105 or application server, and/or document records in the system database 105, among other types of data. When the application server 103 receives a document request from a user device 109, to determine whether the user may access the requested document, the application server 103 may reference a block address containing the digital identity record, and/or a block address for the smart contract containing the permissions rules. The application server 103 is instructed by the smart contract whether to retrieve the document from the system database 105 according the user role, or other user identifier mapping the user or user role to the requested document. The application server 103 may retrieve the document file from the system database 105 upon determining from the smart contract permission data that the user or user role is associated with the document requested.

As mentioned, some embodiments may comprise a system database (or, a database) 105 hosted on one or more computing devices, wherein the system database 105 may store data records associated with various aspects of the application services offered to end users. Non-limiting examples of what may be stored in the system database 105 may include: user records that may comprise data fields describing users (e.g., user data), such as user credentials (e.g., username, passwords, biometrics, encryption certificates), block addresses for blocks on the system blockchain, user account data, user roles or user permissions; document records that may comprise machine-readable computer files (e.g., word processing files), parsed portions of such computer files, or metadata associated with computer files; and application data that may include software instructions executed by an application server 103 or data used by the such applications executed by the application server 103. The system database 105 may be hosted on any number computing devices comprising a non-transitory machine-readable storage medium and capable of performing the various tasks described herein. As shown in FIG. 1, the system database 105 may be accessed by a webserver 101 and/or an application server 103 via one or more networks. But one having skill in the art would appreciate that the system database 105 may be hosted on the same physical computing device functioning as a webserver 101 and/or functioning as an application server 103.

Document records stored on the system database 105 may comprise a data field containing document-identifying hash values generated by an application server 103 according to a hashing algorithm implemented by a system blockchain, when a new document record containing a machine-readable computer file (e.g., PDF, DOC, XSL), such as transaction documents, is generated or updated. The hash value may be generated using one or more data fields that describe the computer file, which may be uploaded by a user via a website portal or pulled from the document record within the system database 105. The hash value may be a unique identifier for the particular document record, and may be used by various computing devices of the system 100, such as the system database 105, to reference the computer file or metadata describing the computer file, which may be stored in the system database 105 and/or on blocks of the system blockchain that is hosted on network nodes 111.

A key storage database 107, sometimes referred in the art as a "high security module," "key appliance," "certificate authority," or the like, may be a computing device configured to manage and distribute encryption keys and cryptographic certificates to various computing devices in the system 100 according to predetermined roles and rules. In some implementations, encryption keys may be used for authentication of users when users log into a website hosted on a webserver 101. In some implementations, encryption keys may be used to encrypt the data blocks of the system blockchain. Additionally or alternatively, encryption keys may be used to confirm, or "sign," data transfers to confirm to a data transfer recipient that the data originated from a known party. Encryption keys may be also be used by users at an application level to apply a digital signature to a document or contract, which, in some cases, may trigger instructions from script code of a smart contract stored on the system blockchain.

The key storage database 107 may be hosted on any number computing devices comprising a non-transitory machine-readable storage medium and capable of performing the various tasks described herein. As shown in FIG. 1, the key storage database 107 may be accessed by a webserver 101 and/or an application server 103 via one or more networks, but the key storage database 107 may also be accessed by a user device 109 and network nodes 111 to retrieve or confirm encryption keys or encryption key signatures. Moreover, one having skill in the art would appreciate that the key storage database 107 may be hosted on the same physical computing device functioning as a webserver 101 and/or an application server 103.

Network nodes 111 may host one or more blocks of the system blockchain. A network node 111 may be any computing device comprising a processor and a non-transitory machine-readable storage medium capable of performing the various tasks and processes described herein. Non-limiting examples of a network node may be a workstation computer, laptop computer, tablet computer, and server computer. Although the network nodes 111 are described as storing blocks of the blockchain in FIG. 1, other computing devices, such as an application server 103, may host blocks of the blockchain. Each network node 111 locally stores an instance of the system blockchain in the storage medium of the system blockchain, and further executes a software application that instructs the network node 111 on generating and querying blocks within the locally stored blockchain instance.

In operation, a network node 111 may generate new blocks on a locally stored instance of the system blockchain according to data received from an application server 103 or other network nodes 111. In some instances, the application server 103 may update a local instance of the blockchain stored on the application server 103, and then instructs one or more of the network nodes 111 to update each blockchain instance stored on such network nodes 111. Moreover, the application server 103 may query the blocks of the system blockchain according to block addresses stored in the system database 105. When the application server 103 executes the query of the blocks on the system blockchain, the application server 103 may poll the network nodes 111 to determine the most recent data on the system blockchain. The application server 103 may be confident that the data at block is the desired data according to a voting mechanism or a consensus threshold encoded within the blockchain software executed by the network nodes 111. Each network node 111 may receive the query for the block and block address, and return a response to the application server 103 indicating whether the block address contains the desired data. In this way, the application server 103 may be certain that data in the blockchain is resistant to corruption, as each blockchain instance on each network node 111 would need to be corrupted in the same way so that each block address is corrupted in the same way.

Furthermore, the system blockchain may also disallow the application server 103 from acting on obsolete data. For instance, a network node 111a may execute a smart contract that instructs the network node 111a to generate a second block that updates data records in a first block on the local blockchain instance. In other words, the data records in the first block may be obsolete being superseded by the data records in the second block. After the update, the network node 111a may then accordingly instruct one or more remaining network nodes 111b, 111c and the application server 103 to update the respective local blockchain instances on those nodes 111b, 111c and application server 103. However, the application server 103 may not have updated its local blockchain instance before the application server 103 receives a data query or instruction for the updated data records from the user device 109 or smart contract. Prior to responding to the query, the application server 103 may use the voting mechanism to ascertain the latest valid blockchain. As the latest valid blockchain may contain the updated data record, such voting mechanism may protect against the application server 103 from acting on obsolete data and may keep the system blockchain resistant to data collisions.

A client device 109 may be any computing device allowing a user to interact with application server 103 via a webserver 101. The client device 109 may execute an Internet browser or local application that access the webserver 101 in order to issue requests or instructions to the application server 103 to access the system blockchain. The client device 109 may transmit credentials from user inputs to the webserver 101, from which the webserver 101 may authenticate the user and, in some implementations, determine a user role. One having skill in the art would appreciate that the client device 109 may comprise any number of input devices configured to receive any number of data inputs, including various types of data inputs allowing for authentication (e.g., username, passwords, certificates, biometrics). One having skill in the art would also appreciate that the client device 109 may be any computing device comprising a processor and non-transitory machine-readable storage medium allowing the client device 109 to perform the various tasks and processes described herein.

As an example of the client device 109 operation, the client device may execute an Internet browser that accesses a webserver 101 hosting an fund investment administration website that allows access for fund managers, administrators and investors and other third parties to a common platform for the end-to-end administration of fund investments, using the devise a fund manager may initiate fund lifecycle events such as a payment request associated with a capital call from investors, and investors may use the platform to view lifecycle events such as the capital call and associated payment obligations due in relation to their investments. Using the client device 109, an investor-user may select an investment in which to invest. As the transaction proceeds, the client devices 109 of the investor-user or a promoter-user may be used upload machine-readable computer files (e.g., PDF, DOC, XSL) containing transaction information. The computer files may be stored into document records in a document database 105, which may then be added to blocks of the system blockchain, where the blocks are accessible according to block addresses that are then stored into the document record for the particular computer file. The client device 109 may issue queries or instructions to the application server 103 via the webpages generated by the webserver 101, which then instruct the application server 103 to query the blocks on the network nodes 111, and, in some instances, perform various tasks, such as retrieving or updating a file from the system database 105.

In some embodiments, the system 100 may store a digital identity record for a user or an entity within the system blockchain. To do so, the system 100 may allow an admin user to generate digital identity templates of different types based on the entity. The template may include mandatory data fields and supplemental data fields. The system 100 may store the templates within the system blockchain and/or in the databases 105. When the system 100 receives a request to generate a digital identity record for an entity, the system 100 may retrieve a digital identity template, either from the system blockchain or from the databases 105, based on the type of the entity. The system 100 may generate a digital identity record based upon the respective digital identity template. The system 100, through one or more network nodes 111, may prompt the entity to enter the information required for data fields in the generated digital identity record. Furthermore, one or more of the data fields of the digital identity record may have an independent status, and the system 100 or a trusted third party server may update the status of the digital identity record.

In addition, a data field within the digital identity record may be associated with a reference document. For example, if the aforementioned entity is a natural person, the reference document may be a scan of a passport of the person and the name data field may reference the scan of the passport. The system 100 may store the scan of the passport in the databases 105, and generate a one directional cryptographic hash of the scan of the passport. Instead of saving the entire file of the scan of the passport in the blockchain, the system 100 may store the cryptographic hash of the file in association with the name data field. This saving protocol allows for immutability of a document file that is not saved within the blockchain but on a non blockchain data repository such as the databases 105. In some implementations, the system 100 may support a biometric identity verification of a user. In these implementations, the system 100 may receive biometric data of a user associated with a digital identity record. The biometric data may include data captured by biometric sensors such as a fingerprint sensor or retina scanner. The system 100 may store the biometric data in the databases 105 and generate a one directional cryptographic hash of the biometric information. The system 105 may store the cryptographic hash of the biometric data in association with the digital identity record. In some embodiments, the system 100 may include a biometric reader device 113. The biometric reader device 113 may include one or more of biometric sensors such as a fingerprint scanner, a retina scanner, a face scanner, and/or any other type of biometric sensor or scanner.

In some embodiments, the system 100 may generate and maintain digital meeting records within the system blockchain. A digital meeting record may comprise, for example, a plurality of data fields to capture various pieces of information associated with a meeting. The system 100 may link the digital meeting record with a plurality of respective digital identity records stored in the blockchain for a plurality of attendees to the meeting. Furthermore, the system 100 may link the digital meeting record with one or more smart contracts for performing various executions related to the meeting. For example, an attendee verification smart contract may authenticate and record attendees to the meeting. As another example, a meeting decision smart contract may include coded conditions of the criteria to reach a decision in the meeting. For instance, the meeting decision smart contract may have a first coded condition to indicate a simple majority will suffice for a less significant decision and a second coded condition to indicate that a two-thirds majority is required for a more significant decision.

Prior to the meeting, the system 100 may generate a digital meeting record, which may form a framework for capturing the pieces of information associated with the meeting. In some instances, the system 100 may generate the digital meeting record based upon a request from a permissioned user (such as an admin user). The system 100 may link the digital meeting record to, or import into the digital meeting a plurality of digital identity records of a plurality of attendees to the meeting. Furthermore, the system 100 may link the digital meeting record to, or import into the digital meeting record a plurality of smart contracts for providing functionality associated with a meeting. The system 100 may also respective cryptographic hashes of documents for the meeting in the digital meeting record while storing the documents in a non-blockchain document repository.

During the meeting, the system 100 may execute the attendee verification smart contract to authenticate and record the presence of an attendee within the digital meeting record. The attendee verification smart contract may receive biometric information from each of attendees, generate a one directional cryptographic hash for the biometric information, and compare the generated hash with the cryptographic hash stored in the respective digital identity record. If the comparison results in a match, the attendee verification smart contract may indicate in the digital meeting that the respective attendee has been authenticated and may record the attendee's presence in the digital meeting record. Furthermore, during the meeting, the system 100 may execute an attendee action smart contract to capture in the digital meeting record, activities of the plurality of attendees such as votes, acknowledgements, and/or signoffs. The attendee action smart contract may further capture various attributes of the activities such as the date and time of each activity, and the location of the attendee during the time of the activity. The attendee action smart contract may capture the activities and the associated attributes in real-time thereby generating an immutable record of the meeting activities within the digital meeting record. The system 100 may further execute a meeting decision smart contract on the captured activities to determine one or more meeting decisions. For example, a meeting decision may be based on a tally of votes captured by the attendee action smart contract.

After the meeting, the system 100 may generate a post meeting document (e.g. a document containing meeting minutes) by autopopulating the document with various pieces of information from the digital meeting record. The system 100 may transmit the post meeting document to each of the attendees of or a portion of the attendees for their respective approvals. Once the approvals have been received together with the biometric information of the attendees, the system 100 may store a one directional cryptographic hash of the post meeting document to the digital meeting record in association with the hashes of biometric information received from the attendees. The system 100 may store the post meeting document to a non-blockchain based repository such as the database 105. Therefore, the system may generate an immutable digital record of all the meeting activities, decisions, and post meeting documents within the blockchain. In some embodiments, the system 100 may comprise a separate document repository 115. In addition or in alternate to the database 105, the system may store the various meeting documents in the document repository 115. In some embodiments the document repository 115 is local to one or more components of the system 115 such as the application server 103. In other embodiments, the document repository 115 is remote from the system 100.

Figure 2:
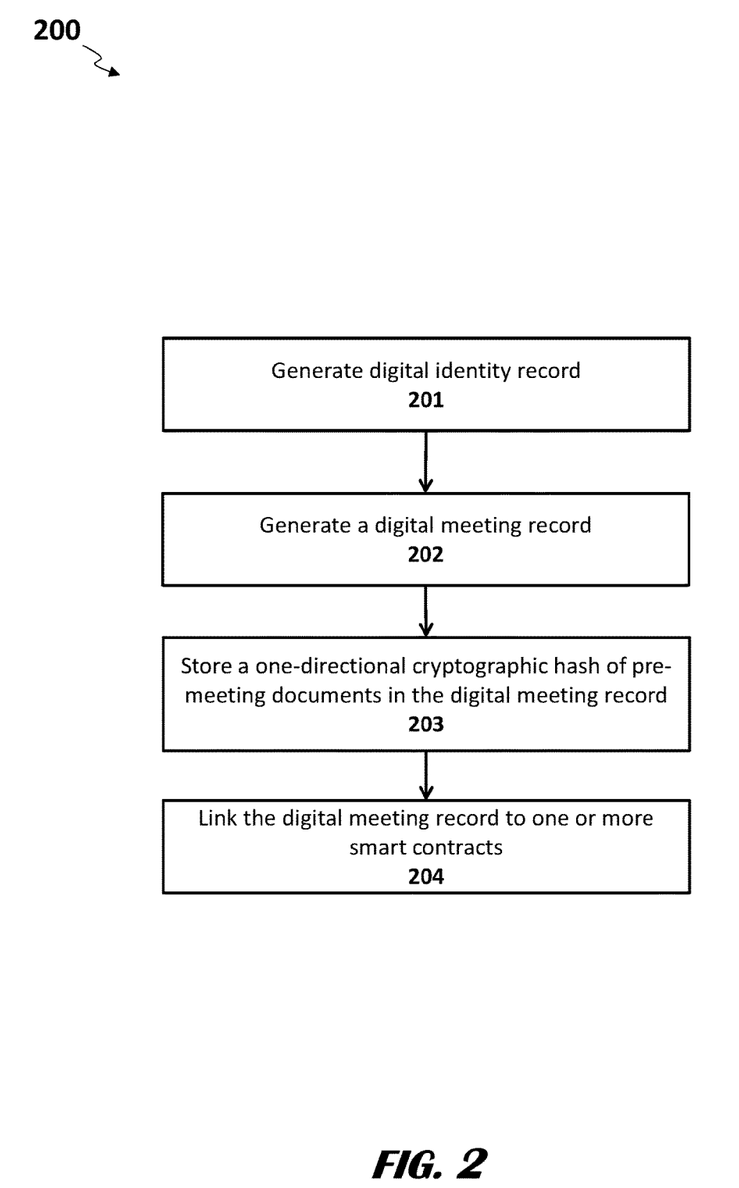
FIG. 2 shows execution of an exemplary method 200 for a first aspect of digital meeting management, according to an exemplary embodiment.

FIG. 2 shows an exemplary method 200 for a pre-meeting management, according to an exemplary embodiment. Although one or more computing systems may implement the following steps of the method 200, this description details for brevity, a computer system implementing the steps. The computer system, for example, may include an application server, a web server, a network node within a distributed network nodes, or a combination of one or more of these systems. Furthermore, one having ordinary skill in the art should understand that the following steps are merely exemplary, and one more steps can be added or substituted, or the method 200 may skip one or more steps altogether.

In a first step 201, computer system server may generate a digital identity record for meeting attendees. The meeting attendees may be participants of one or more processes within the blockchain. The process of generating the digital identity record is detailed in U.S. patent application Ser. No. 15/845,662, which is incorporated herein by reference in its entirety.

In a next step 202, the computer system may generate a digital meeting record. In some embodiments, the computer system may generate the digital meeting record upon execution of a digital meeting smart contract. For example, a blockchain event upstream may necessitate a meeting and trigger the digital meeting smart contract, which, upon execution may generate the digital meeting record. For example in a private equity context, a meeting may be warranted after a threshold amount of responses have been received in response to a capital call. In some embodiments, the computer system may generate the digital meeting record in response to receiving a request from a permissioned user, that is, an admin user or the like with appropriate permission controls in the associated digital identity record. In these embodiments, the computer system may execute a screen based application to render a user interface for the permissioned user to enter and/or select pieces of information to generate the digital meeting record.

The digital meeting record may contain a plurality of data fields configure to store pieces of information regarding a meeting. Non-limiting examples of the data fields may include date, time, and location of the meeting; attendees to the meeting, and documents associated with the meeting. In some embodiments, one or more data fields of the digital meeting record may be empty and the computer system may update the digital meeting record during the steps of the method 200 to fill in pieces of information to the respective data fields. The computer system may retrieve the pieces of information for the data fields from the blockchain or from non-blockchain based sources, for example, from a client device.

In a next step 203, the computer system may store a one-directional cryptographic hash of pre-meeting documents in the digital meeting record. Non-limiting examples of pre-meeting documents may include agendas, reports, and proposals for the meeting. In some embodiments, the computer system may receive the pre-meeting documents from a permissioned user. The permissioned user, for example, may utilize on-screen tools provided by the computer system to generate or upload the pre-meeting documents. Once received, the computer system may execute a hashing algorithm to generate a one directional cryptographic hash for each of the documents. The computer system may then store the generated hashes to the digital meeting record and store the received documents to a document repository. The document repository may be a non-blockchain storage, either local to or remote from the computer system.

In a next step 204, the computer system may link the digital meeting record to one or more smart contracts. For example, the computer system may link the digital meeting record to an attendee verification smart contract, an attendee action smart contract, and/or a meeting decision smart contract. For instance, the computer system may import the meeting decision smart contract into the digital meeting record, that is, the meeting decision smart contract may be an information entry to a data field within the digital meeting record. The computer system may retrieve the meeting decision smart contract from the blockchain. To do so, the computer system may query a local database to retrieve the block address of the meeting decision smart contract and use the block address to query the blockchain to retrieve the meeting decision smart contract. The meeting decision smart contract may include coded conditions of the criteria to reach a decision in the meeting. For instance, the meeting decision smart contract may have a first coded condition to indicate a simple majority will suffice for a less significant decision and a second coded condition to indicate that a two-thirds majority is required for a more significant decision. The coded conditions may be stored in a decision criteria library within the blockchain.

Figure 3:
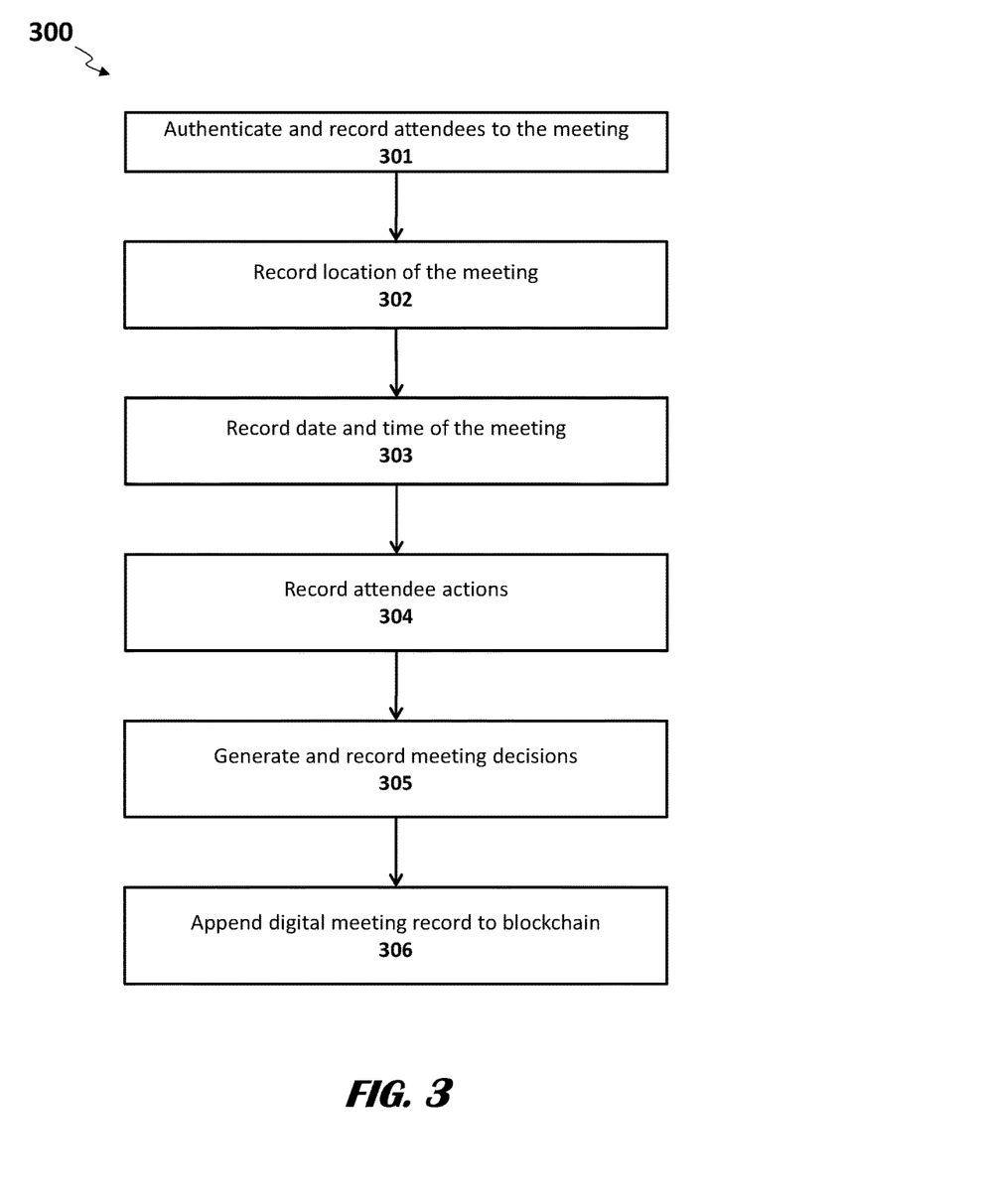
FIG. 3 shows an exemplary method 300 for a second aspect of digital meeting management, according to an exemplary embodiment.
Figure 4:
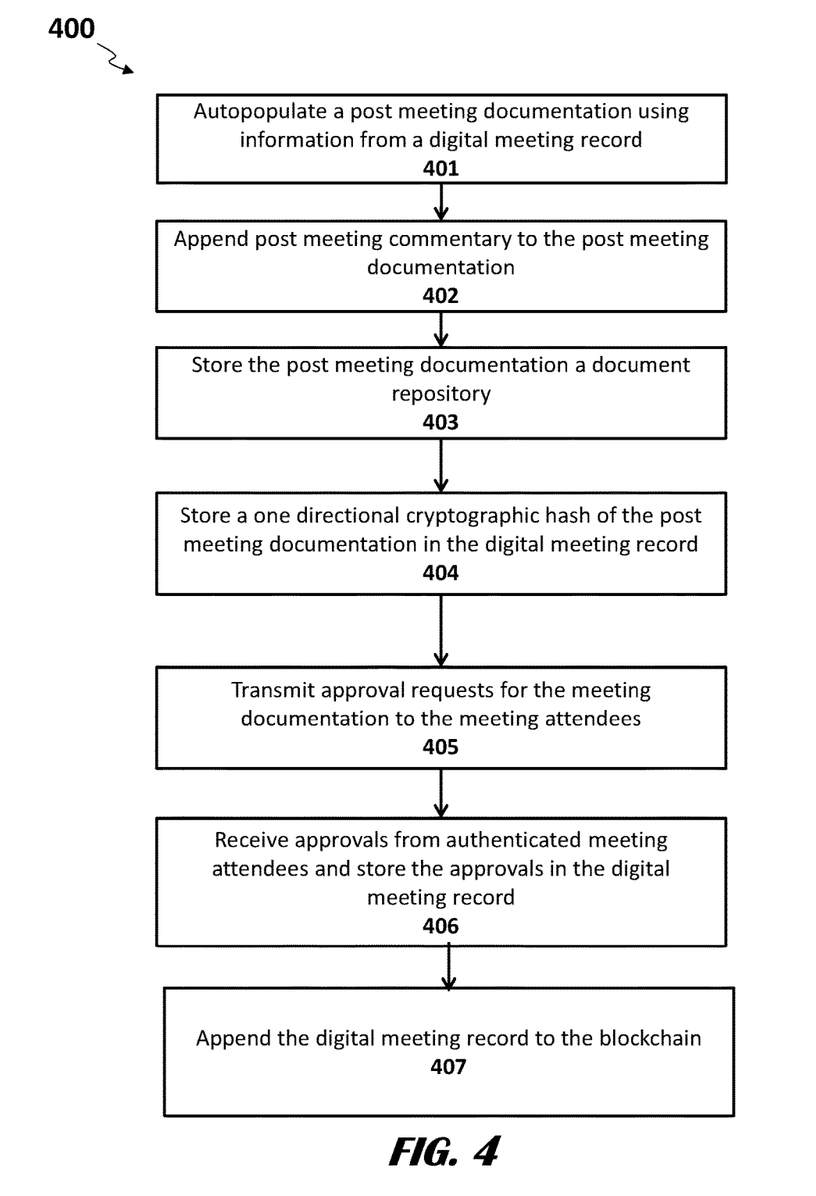
FIG. 4 shows an exemplary method 400 for a third aspect of digital meeting management, according to one exemplary embodiment.

After the completion of the steps of the method 200, the computer system, in some implementations may generate a digital meeting record block and append the digital meeting record block to the blockchain. In other implementation, the computer system may store the digital meeting record locally for further processing by other methods such as the methods 300 and 400 as detailed below.

FIG. 3 shows an exemplary method 300 of digital meetings management, according to an exemplary embodiment. Although one or more computing systems may implement the following steps of the method 300, this description details for brevity, a computer system implementing the steps. The computer system, for example, may include an application server, a web server, a network node within a distributed network nodes, or a combination of one or more of these systems. Furthermore, one having ordinary skill in the art should understand that the following steps are merely exemplary, and one more steps can be added or substituted, or the method 300 may skip one or more steps altogether.

In a first step 301, the computer system may authenticate and record attendees to a meeting. More particularly, the computer system may authenticate meeting attendees from a pool of multiple users seeking authentication (also described as verification) and electronically record the presence of the meeting attendees. In some embodiments, the computer system may use biometric identity verification for authenticating a user as an attendee. The computer system may receive biometric information captured by a mobile device or any other type of computing device ("capturing device") of the user. The mobile device or any other type of computing device may run a digital meeting web application allowing a respective user to seek attendance to the meeting. Non-limiting examples of biometric information may include fingerprint data, face scan data, and retina scan data. And the capturing device may the user's personal smart phone, tablet, a desktop computer, and/or a device embedded within or provided by the computer system implementing this method 300. For example, the computer system may have a fingerprint sensor to record each of each user attending arriving to a physical meeting site. The users seeking to attend the meeting remotely may user their capturing devices to capture the biometric information, which, the capturing devices may then transmit to the computer system.

Once the computer system receives or captures the biometric information of a user, either from a remote client device or from a local device; the computer system uses a mathematical hashing function to generate a one directional cryptographic hash of the received or captured biometric information. The computer system may use the so generated cryptographic hash to both authenticate and record the presence of the respective attendee. To authenticate the attendee, the computer system may compare the generated cryptographic hash to the cryptographic hash of biometric information stored in the digital identity record of the attendee. If the comparison returns a match, the computer system may indicate in the digital meeting record that the user has been authenticated as an attendee to the meeting. However, if the comparison does not return a match, the computer system may indicate in the digital meeting record that an authentication attempt has been made and generate a message for the user to try again. After a predetermined number of authentication attempts, the computer system may indicate a potential fraud and trigger fraud mitigation and other security measures.

For the authenticated attendee, the computer system may store the cryptographic hash in the digital meeting record as a record of the attendee of the meeting. Furthermore, the computer system may store the biometric information in a local or remote repository. In some embodiments, the computer system may generate a hash for and store in the repository more information in addition to the biometric information. For example, the computer system will store in the repository the date and time of the receipt of the biometric information and the location from which the biometric information was sent. The location information may include GPS coordinates of user's device generated by a trusted GPS source. The computer system may generate a separate one directional cryptographic hash for the additional information or generate a single hash for the biometric information and additional information and store the hash in the digital meeting record. The hash of the biometric information, sometimes in combination with the hash of the additional information, may serve as a record of the attendee's presence during the meeting. Therefore, once digital meeting record has been appended to the blockchain, an indisputable and immutable record of the attendee's presence is established.

In some embodiments, the computer system may receive a document to be presented at the meeting from an authenticated attendee. The document may be, for example, a list of proposals from the attendee. The computer system may generate a one directional cryptographic hash of the received document and store the generated cryptographic hash in the digital meeting record in association with the digital identity record of the authenticated attendee. The computer system may store the received document in the non-blockchain repository.

The computer system may execute one or more smart contracts to achieve the aforementioned functionality of step 301. For example, the computer system may download from the blockchain and execute an attendee verification smart contract to authenticate and record the presence of an attendee within the digital meeting record.

In a next step 302, the computer system may record a location of the meeting. In some embodiments, the computer system may determine the location of the meeting based on the location information received from one or more attendees to the meeting. For example, the computer system may receive a common set of GPS coordinates from multiple attendees and determine that the meeting is at the location identified by the common set of GPS coordinates. In other embodiments, the computer system may receive the meeting location as a manual entry by a permissioned user. In some instances, not all the attendees (i.e., authenticated users) may be in a single location for the meeting. The meeting may be virtual, wherein the attendees are scattered throughout various geographic locations. In these instances, the computer system may record the location of each of the attendees in the digital meeting record. Furthermore, as detailed below, the computer system may record the location of an attendee each time the attendee takes an action associated with the meeting.

In a next step 303, the computer system may record a data and time of the meeting. In some embodiments, the computer system may receive the date and time and from the devices of the meeting attendees. In other embodiments, the computer system may receive the date and time from a manual entry by a permissioned user. The computer system may record the date and time within the digital meeting record. Furthermore, as described below, the computer system may receive and record the date and time each time the computer system receives an indication of attendee actions.

In next step 304, the computer system may record attendee actions during the meeting. More particularly, the computer system may record the attendee actions in the digital meeting record based upon executing one or more smart contracts in the blockchain. An exemplary smart contract may be an attendee action smart contract. The attendee actions may include one or more actions related to the meeting such as an acknowledgement, vote, approval, and/or sign-off. The attendee actions may further be associated one or more meeting items such as agenda, proposals, and/or resolutions. For example, a first attendee may digitally present a proposal at the meeting allowing for the other attendees to vote on the proposal. The computer system may then record the votes from each of the other attendees.

The computer system may receive the attendee actions from various communication media such as a text message, e-mail message, and/or inputs to a web application on a mobile device. For each attendee action, the computer system may receive the respective attendee's biometric information, and use the biometric information to ensure the authenticity of the attendee's action. Continuing with the above example of voting on a proposal, the computer system may receive the attendee's biometric information along with the vote. The computer system may first use the biometric information to authenticate by generating a one directional cryptographic hash of the received biometric information and then comparing the generated hash to that store in the respective digital identity record. The computer system may further use the received biometric information as the attendee's authentication of the vote. In other words, the received biometric information may serve a dual purpose, first for the computer system to authenticate the vote, and second for the attendee to authenticate the vote. In this example, the computer system may record in the digital meeting record, the received vote in association with the hash of the biometric information.

In addition to the biometric information, the computer system may further receive and record date, time, and/or location associated with the attendee actions through execution of one or more smart contracts. For example, a mobile device of an attendee may transmit date, time, and/or location stamp for the actions of the respective attendee to the computer system. In some implementation, the computer system may receive the date and time from a third party source such as an Oracle. The computer system may record the received the date, time, and/or location information in the digital meeting record. In other words, for each of the attendee actions associated with the meeting, the digital meeting record may contain the action, the biometric hash (or biometric signature of the attendee), and date, time, and location of the attendee at the time of the action. Furthermore, the computer system may track and record the attendee actions together with the aforementioned attributes of the actions within the digital meeting record in real-time, which when uploaded to blockchain become immutable and authenticated record of all the meeting activities within the blockchain.

In a next step 305, the computer system may generate and record the meeting decisions. More particularly, the computer system may execute one or more smart contracts over the attendee actions recorded in the previous step 304. An exemplary smart contract may include a meeting decision smart contract that may contain one or more coded conditions for reaching a meeting decision based on the recorded attendee actions. In other words, the one or more coded conditions may define decision criteria for one or more decisions in the meeting.

In a voting scenario, a meeting decision smart contract may indicate that a simple majority is enough for a first proposal and a two-thirds majority is required for a second proposal. The digital meeting record, based on the execution of the previous step 304, may contain the record of the votes for each of the first and second proposals. Upon execution, the meeting decision smart contract may tally the votes for each of the first and second proposals. For the first proposal, the meeting decision smart contract may generate a first meeting decision that the first proposal has passed based upon determining that the vote tally meets the simple majority. Similarly, for the second proposal, the meeting decision smart contract may generate a second meeting decision based upon determining that the vote tally meets the requisite two-thirds majority. The meeting decision smart contract may then record the meeting decisions into the digital meeting record.

In a next step 306, the computer system may append the digital meeting record to the blockchain. In some implementations, the network node may download a new latest valid blockchain based upon one or more consensus algorithms prior to appending the digital meeting record to the blockchain. To do so, the computer system may poll other network nodes and determine the latest valid blockchain. The computer system may use a predetermined threshold for determining the latest valid blockchain. For example, the computer system may query the network nodes for the latest blockchain. If the computer system receives the same blockchain from 51% of the network nodes, the computer system may determine that the received blockchain is the latest valid blockchain. One ordinarily skilled in the art appreciates that the predetermined threshold is set upon the level of integrity required for the data and instructions stored in the blockchain. The computer system may use a higher predetermined threshold for data requiring a higher level of security and integrity. After the computer system determines the latest valid blockchain, the computer system may append the digital meeting record to the latest valid blockchain. To do so, the computer system may use the hash of contents of the last block of the latest valid blockchain to generate the address of a block containing the digital meeting record ("digital meeting record block"). In addition, the computer system may use the hash of the contents of the digital meeting record to generate the address of the digital meeting record block. In some implementations, the computer system may use the hash of the contents of the last block, the hash of the contents of the digital meeting record block, and a nonce value to generate the address of the digital meeting record block. The computer system may then store the address of the digital meeting record block in a database.

Furthermore, the computer system may encrypt the data in the digital meeting record block by using an algorithm such as a hashing algorithm. The application may generate a hash value of the contents of the digital meeting record block and store the hash value in the digital meeting record block. For instance, the computer system may hash portions of the digital meeting record block separately to create intermediate hash values and generate a final hash value based on the intermediate hash values and store the final hash value in the digital record block. Alternatively, the computer system may hash the entire content of the digital meeting record block to generate the final hash value and store the hash value in the digital meeting record block. In other implementations, the computer system may use symmetric or asymmetric keys to encrypt the contents of the digital meeting record block.

In other implementations, the network node may use the blockchain validated in the previous steps to deploy append the digital meeting record block to the blockchain. In some implementations, the computer system may transmit an instruction to the network nodes to append the digital meeting record block to the latest valid blockchain as determined by one or more of the network nodes. In these implementations, the computer system may receive the address of the digital meeting record block in the blockchain from one or more network nodes and store the address in the database.

One having ordinary skill in the art should understand that recording in some embodiments may be the computer system recording various pieces of information within the digital meeting record. In other embodiments, the computer system may record some pieces of information to the digital meeting record and other pieces of information in a non-blockchain database. One having ordinary skill in the art should further understand that the computer system may generate a one directional cryptographic hash for each piece of information or some pieces of information prior to recording in the digital meeting record.

The computer system may append the digital meeting record at any time during the execution of the aforementioned steps. For example, the computer system may append the digital meeting record to the blockchain after executing step 301, and for executing step 302, the computer system may download the digital meeting record or use a local copy of the digital meeting record for further updates to the digital meeting record. In some embodiments, the computer system may append the digital meeting record to the blockchain after each of the aforementioned steps. In other embodiments, the computer system may append the digital meeting record to the blockchain after some of the steps or at the end of executing all of the steps. In yet other embodiments, the computer system may append the digital meeting record to the blockchain during an execution of one or more of the aforementioned steps.

FIG. 4 shows an exemplary method 400 of post meeting management, according to an exemplary embodiment. Although one or more computer systems may implement the steps of the method 400, the description below describes, for brevity, a computer system implementing the steps of the method 400.

In a first step 401, the network node may autopopulate post meeting documentation using information from a digital meeting record. The digital meeting record may have been generated and/or updated by one or more of the aforementioned methods 200 and 300. That is, the digital meeting record may contain various actions taken by the meeting attendees, various proposals presented during the meeting, and various decisions reached during the meeting. A post meeting documentation may be any type of file such as a PDF file, a MS-Word file, and a LaTeX File containing text and graphics containing information related to and generated during the meeting. The network node may use these pieces of information and/or other pieces of information to autopopulate one or more post meeting documentations such as a meeting minutes document. The meeting minutes document may contain, based upon the autopopulating by the network node, for example, the names of the attendees of the meetings, the proposals and/or votes of each attendee, and decision reached during the meeting.

In a next step 402, the network node may append post meeting commentary to the post meeting documentation. For example, the network node may receive, via a web application, a post meeting commentary from a meeting organizer (which may be a permissioned user) to be added to the post meeting documentation. The post meeting documentation may have a data field or an appropriate location for the commentary. For example, if the post meeting documentation is a MS-Word file, the network node may reserve a portion of the file for a commentary. The commentary may include, for example, a tag for a future discussion, the meeting organizer's caveat on a meeting decision, reference links to various pieces of information in the post meeting documentation, and/or any other type of commentary.

In a next step 403, the network node may store the post meeting documentation in a document repository. The document repository may be a non-blockchain database either locally or remotely accessible by the network node.

In a next step 404, the network node may store a one directional cryptographic hash of the post meeting documentation in the digital meeting record. To do so, the network node may first generate the one directional cryptographic hash of the post meeting documentation using a mathematical hashing function. The network node may then store the so generated one directional cryptographic hash to the digital meeting record.

In a next step 405, the network node may transmit approval requests for the meeting documentation to the meeting invitees. The network node may transmit the approval request through communication media such as e-mail, text message, phone calls, and/or any other type of communication medium. The meeting attendees may receive the approval requests at the respective client devices such as mobile phones.

In a next step 406, the network node may receive approvals from authenticated meeting attendees and store the approvals in the digital meeting record. The network node may receive the approvals through communication media such as e-mail, text message, phone calls, and/or any other type of communication medium.

In some embodiments, the network node may receive one or more biometric approvals for the meeting documentation. That is, one or more attendees may use their respective devices to enter in biometric information as an act of approval for the provided meeting documentation. For example, a first attendee may use a fingerprint sensor in his mobile device to transmit an approval to the network node. As another example, a second attendee may use a retina scanner on her computer to transmit an approval to the network node. One having ordinary skill in the art understands that these biometric approvals are merely exemplary, and other forms of biometric approvals should also be considered within the scope of this disclosure.

The network node may also store the approvals in the digital meeting record. The network node may use a mathematical hashing function to generate a one directional cryptographic hash of the received approval message. For example, in case of biometric approval, the network node may generate a one directional cryptographic hash of the received biometric information such as fingerprint data or retina scan data; and store the generated cryptographic hash to the digital meeting record.

In next step 407, the network node may append the digital meeting record to the blockchain, using similar steps as detailed in method 300.

One having ordinary skill in the art should understand by now that the various steps of the aforementioned methods 200, 300, and 400 may generate and append to the blockchain in real-time, an immutable digital meeting record. One or more smart contracts may automate the process to generate an essentially tamper-proof digital meeting record stored in the blockchain. Therefore, one or more of the system 100, and the method 200, 300, and 400 may provide an integrated functionality to generate the immutable digital meeting record in the blockchain, which has not been provided by conventional blockchain technology.

The foregoing method descriptions and the process flow diagrams are provided merely as illustrative examples and are not intended to require or imply that the steps of the various embodiments must be performed in the order presented. The steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, and the like. When a process corresponds to a function, the process termination may correspond to a return of the function to a calling function or a main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims. Furthermore, qualifiers "a" and "an" before a logical block, a module, a circuit, and an algorithm are not intended to be limiting, and multiple such components should be considered to be within the scope of this disclosure.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the generic principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A computer-implemented method for generating an immutable digital meeting record, the method comprising:

generating, by a network node of a plurality of network nodes, a digital meeting record containing one or more data fields for information associated with a meeting;

importing, by the network node to the digital meeting record, a meeting decision executable code located in a block of a blockchain, the meeting decision executable code containing one or more coded conditions for a decision in the meeting from a decision criteria library stored in the blockchain, wherein the blockchain includes blocks of data hosted on a subset of the plurality of network nodes, and wherein the network node determined that the blockchain is a latest valid blockchain based on a consensus threshold;

associating, by the network node, the digital meeting record with a plurality of digital identity records stored in the blockchain, wherein each of the plurality of digital identity records is associated with a respective attendee of the meeting;

executing, by the network node, an attendee verification executable code to authenticate a plurality of attendees to the meeting, wherein authentication for each attendee is based upon a match between a one directional cryptographic hash of biometric information received from the attendee and a one directional cryptographic hash stored in a respective digital identity record associated with the attendee, wherein the respective digital identity record stores the one directional cryptographic hash of biometric information without storing the biometric information;

generating, by the network node, a one directional cryptographic hash of a document and storing in the digital meeting record the one directional cryptographic hash in association with the a first digital identity record of a first attendee of the plurality of attendees, wherein the document is stored in a non-blockchain document repository;

storing, by the network node in the digital meeting record, respective location information of each of the plurality of attendees, wherein the respective location information is received from a global positioning system of a respective client device;

executing, by the network node, an attendee action executable code to capture in real-time and store in the digital meeting record actions of each of the plurality of attendees;

executing, by the network node, the meeting decision executable code on the captured actions of each of the plurality of attendees to determine one or more meeting decisions;

storing, by the network node in the digital meeting record, the one or more meeting decisions;

encrypting, by the network node, at least a portion of the digital meeting record using one or more encryption keys to generate an encrypted digital meeting record; and appending, by the network node, the encrypted digital meeting record to the blockchain.

2. The method of claim 1, further comprising:
transmitting, by the network node, digital notification messages to respective client devices of each of the plurality of attendees.

3. The method of claim 1, further comprising:
autopopulating, by the network node, a post meeting documentation based on the information in one or more date fields in the digital meeting record.

4. The method of claim 3, further comprising:
generating, by the network node, a one directional cryptographic hash of the post meeting documentation;
storing, by the network node, the one directional cryptographic hash of the post meeting documentation in the digital meeting record; and
storing the post meeting documentation in the non-blockchain document repository.

5. The method of claim 4, further comprising:
transmitting, by the network node, the post meeting documentation to a first client device of a first attendee;
receiving, by the network node, a first indication of an approval from the first client device, wherein first indication approval includes biometric information of the first attendee;
generating, by the network node, a first one directional cryptographic hash of the biometric information; and
storing, by the network node in the digital meeting record, the first one directional cryptographic hash of the biometric information in association with the one directional cryptographic hash of the post meeting documentation.

6. The method of claim 1, wherein the attendee action executable code captures location information, date, and time associated with the actions and decisions of each of the plurality of attendees.

7. The method of claim 1, wherein the actions and decisions of each of plurality of the attendees comprise at least one of vote, acknowledgement, approval, and sign-off.

8. The method of claim 1, further comprising:
setting, by the network node, a permission controls table for the digital meeting record.

9. A system for generating an immutable digital meeting record, the system comprising:
a plurality of network nodes, each including a non-transitory storage medium storing a respective local copy of a blockchain;
at least one of the plurality of network nodes having a processor configured to:
generate a digital meeting record containing one or more data fields for information associated with a meeting;
import to the digital meeting record, a meeting decision executable code located in a block of a blockchain, the meeting decision executable code containing one or more coded conditions for a decision in the meeting from a decision criteria library stored in the blockchain, wherein the blockchain includes blocks of data hosted on a subset of the plurality of network nodes, and wherein the processor determined that the blockchain is a latest valid blockchain based on a consensus threshold;
associate the digital meeting record with a plurality of digital identity records stored in the blockchain, wherein each of the plurality of digital identity records is associated with a respective attendee of the meeting;
execute an attendee verification executable code to authenticate a plurality of attendees to the meeting, wherein authentication for each attendee is based upon a match between a one directional cryptographic hash of biometric information received from the attendee and a one directional cryptographic hash stored in a respective digital identity record associated with the attendee, wherein the respective digital identity record stores the one directional cryptographic hash of biometric information without storing the biometric information;
generate a one directional cryptographic hash of a document and store in the digital meeting record the one directional cryptographic hash in association with the a first digital identity record of a first attendee of the plurality of attendees, wherein the document is stored in a non-blockchain document repository;
store in the digital meeting record, respective location information of each of the plurality of attendees, wherein the respective location information is received from a global positioning system of a respective client device;
execute an attendee action executable code to capture in real-time and store in the digital meeting record actions of each of the plurality of attendees;
execute the meeting decision executable code on the captured actions of each of the plurality of attendees to determine one or more meeting decisions;
store in the digital meeting record, the one or more meeting decisions;
encrypt at least a portion of the digital meeting record using one or more encryption keys to generate an encrypted digital meeting record; and
append the encrypted digital meeting record to the blockchain.

10. The system of claim 9, wherein the processor is further configured to:
transmit digital notification messages to respective client devices of each of the plurality of attendees.

11. The system of claim 9, wherein the processor is further configured:
autopopulate a post meeting documentation based on the information in one or more date fields in the digital meeting record.

12. The system of claim 11, wherein the processor is further configured to:
generate a one directional cryptographic hash of the post meeting documentation;
store the one directional cryptographic hash of the post meeting documentation in the digital meeting record; and
store the post meeting documentation in the non-blockchain document repository.

13. The system of claim 12, wherein the processor is further configured to:
transmit the post meeting documentation to a first client device of a first attendee;
receive a first indication of an approval from the first client device, wherein first indication approval includes biometric information of the first attendee;
generate a first one directional cryptographic hash of the biometric information; and
store in the digital meeting record, the first one directional cryptographic hash of the biometric information in association with the one directional cryptographic hash of the post meeting documentation.

14. The system of claim 9, wherein the attendee action executable code captures location information, date, and time associated with the actions and decisions of each of the plurality of attendees.

15. The system of claim 9, wherein the actions and decisions of each of plurality of the attendees comprise at least one of vote, acknowledgement, approval, and sign-off.

16. The system of claim 9, wherein the processor is further configured to: set a permission controls table for the digital meeting record.

\* \* \* \* \*